(12) United States Patent
Barham

(10) Patent No.: US 6,740,249 B1
(45) Date of Patent: May 25, 2004

(54) FILTRATION AID FOR THE BAYER PROCESS

(75) Inventor: Scott Barham, Perth (AU)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 09/484,071

(22) Filed: Jan. 18, 2000

(30) Foreign Application Priority Data

Jan. 20, 1999 (AU) .............................................. PP8258

(51) Int. Cl.[7] .................................................. C09K 3/00
(52) U.S. Cl. ............................ 252/1; 423/121; 210/731
(58) Field of Search ............................ 252/1; 210/731; 423/121; 209/5; 106/215.1, 217.2

(56) References Cited

U.S. PATENT DOCUMENTS

| | | | | |
|---|---|---|---|---|
| 3,085,853 A | * | 4/1963 | Lesinski et al. | |
| 3,397,953 A | * | 8/1968 | Gelvin et al. | |
| 3,541,009 A | * | 11/1970 | Arendt et al. | |
| 3,681,012 A | * | 8/1972 | Sibert | |
| 5,091,159 A | | 2/1992 | Connelly et al. | |
| 5,217,620 A | * | 6/1993 | Mahoney et al. | |
| 5,387,405 A | * | 2/1995 | Connelly et al. | ........... 423/122 |
| 5,516,435 A | * | 5/1996 | Lewellyn | |
| 5,716,530 A | | 2/1998 | Strominger et al. | |

* cited by examiner

Primary Examiner—Steven Bos
(74) Attorney, Agent, or Firm—Margaret M. Brumm; Thomas M. Breininger

(57) ABSTRACT

A formulation for use as a treating agent in the Bayer process is disclosed. The formulation comprises a blend of 200–300 ppm of starch and up to 10 ppm of another polysaccharide. When added to a liquor derived from the digestion of bauxite ore in a caustic solution to extract alumina, the formulation may result in increased filterability of the liquor. The formulation may also be used in conjunction with a filter aid in the filtration of a caustic sodium aluminate solution.

8 Claims, 1 Drawing Sheet

FILTRATION AID FOR THE BAYER PROCESS

TECHNICAL FIELD

Figure 1:
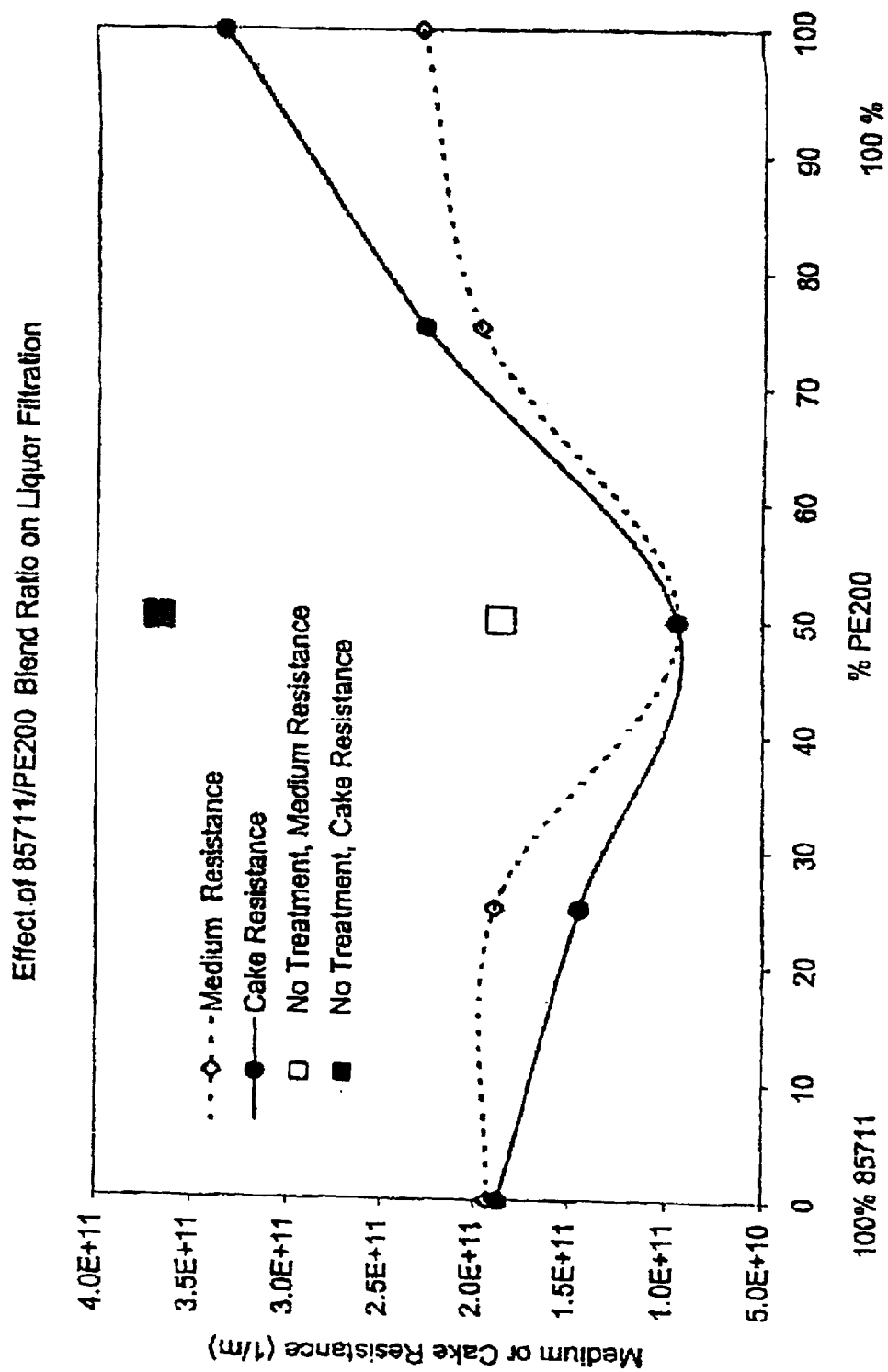

The present invention relates to treating agents and particularly to treating agents for filtration of caustic sodium aluminate solutions from the Bayer process.

BACKGROUND ART

In the Bayer process, alumina is refined from bauxite ores. The process comprises digesting the ore in a caustic solution to extract alumina, clarifying the liquor to remove caustic insoluble red mud material and precipitating alumina crystals as its trihydrate form from the clarified liquor. Clarifying the liquor involves separating the solid particles from the liquor by settling and if necessary, filtration.

The clarified, filtered liquor is then cooled until it becomes super-saturated and seeded with crystals of alumina trihydrate. Alumina is precipitated as the trihydrate in tanks and the solids are classified by particle size. The coarse fraction of alumina trihydrate (primary) is then dewatered eg by rotary vacuum filters and washed to reduce its soda level. The alumina product is then transferred to calciners where any free or combined water is removed if it is intended that the alumina be used in the manufacture of aluminium metal. If the alumina is to be used in other applications, some of the free water will be removed but not necessarily the water of hydration.

As discussed in U.S. Pat. No. 5,091,159 (incorporated herein by reference), it has been found that dextran is a particularly suitable treating agent for filtration. The dextran is added to the liquor, which preferably already contains a calcium aluminate filter aid, in quantities of 0.5–15 mg/l as the only treating agent. This addition of dextran has been shown to give substantial improvements in filtration time.

Of course, in the quantities used in the Bayer process, such additions of dextran can be quite expensive.

The present invention seeks to overcome at least some of the disadvantages of the prior art or at least provide a commercial alternative thereto.

DISCLOSURE OF THE INVENTION

In a broad first aspect, the present invention provides a treating agent for use in the Bayer process in filtration of caustic sodium alumina solution said treating agent comprising a blend of starch and another polysaccharide.

Preferably, the polysaccharide of the treating agent is selected from the group consisting of pullalan, dextran, alginate, zooglan, lactan or mixtures thereof.

In another embodiment, the treating agent is used in conjunction with a filter aid in the filtration of the caustic sodium aluminate solution. Preferably the filter aid is calcium aluminate and most preferably a 12% aqueous suspension of calcium aluminate.

Such a filter aid is useful when the caustic sodium aluminate solution is filtered by a Kelly pressure filter. Such a filter aid may not be required in all circumstances, eg, where a sand filter is used to filter the caustic sodium aluminate solution.

In a further preferred embodiment, the treating agent comprises up to 10 ppm preferably up to 5 ppm of the polysaccharide and up to 200–300 ppm of starch.

In still another preferred embodiment, the treating agent comprises a polysaccharide to starch ratio of between 9:1 and 1:9.

In a further aspect, the present invention provides an improvement in the Bayer process wherein bauxite is added to a caustic solution to produce a slurry of sodium aluminate solution and an insoluble red mud fraction which is then subjected to a thickener and separation step to produce a thickener overflow, said thickener overflow being subjected to filtration, the improvement comprising providing a blend of starch and another polysaccharide to the thickener overflow as a treating agent prior to said filtration.

The present applicant has surprisingly found that at least part of the polysaccharide normally used as a treating agent in the filtration step of the Bayer process can be replaced with starch without any substantial loss in filterability. Indeed the addition of certain blends of polysaccharide and starch as a treating aid may result in increased filterability of the liquor as compared to polysaccharide alone as a filter aid.

Clearly this has significant advantages since starch is only a fraction of the cost of the aforementioned polysaccharides. Any replacement of the polysaccharide by a low-cost product such as starch will substantially increase the commercial viability of the process.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BEST MODE FOR CARRYING OUT THE INVENTION

To illustrate the advantages of the invention the following results are presented by way of example only.

Test Series A and B

Filtration tests were conducted on the green liquor at a typical alumina plant using the Bayer process plant, the results of which are shown in the table below.

The polysaccharide used was dextran as a 7% aqueous solution. The starch component was a 10% (100 g/l) aqueous solution produced by adding powder to 10 g/l sodium hydroxide and agitating at 60° for 15 minutes.

Two series of test were conducted. Series A had 10 tests (1A–10A) and series B had 6 tests (1B–6B).

As shown in Table 1, for series A several different blends of the treating agent were used in the filtration tests. Test number 2A uses a simple aqueous solution of dextran with no addition of starch. Tests 4A, 6A and 8A use varying dextran/starch ratios and test 10A uses a simple aqueous solution of starch. Each test was compared with a corresponding blank which did not use any treating agent.

As shown in Table 2, for series B, tests 2B, 4B and 6B similarly use varying dextran/starch ratios.

The times for filtering various quantities (50 ml, 100 ml and 150 ml) were measured. The filtration rates were then calculated and these rates compared with the corresponding blank to provide a percentage measure of the increase/decrease flotation rates (%50, %100 and %150).

It is clear from the results below that the blending of the polysaccharide treating agent with starch provides no real significant decrease in filterability of the green liquor and in fact in some instances provides an advantage.

For test series A when using an aqueous solution of dextran as the treating agent, there is an average improvement in filterability of around 52%. When starch, however, is mixed with the dextran there is a slight reduction in filterability but a substantial cost saving. Tests 4A, 6A and 8A have an average improvement in filterability over their corresponding blank of around 37%, 41% and 46%. This compares very favourably with the pure dextran treating agents.

Series B testing provided even better results. Test 2B shows an average improvement in filterability of 46.1% where the treating agent is an aqueous solution of dextran. Tests 413 and 6B show of 55% and 45% improvement in filterability when the dextran is mixed with 50% and 75% respectively of starch. This of course compares extremely favourably with the dextran treating agent.

Accordingly, it is clear that even small additions of starch to the polysaccharide treating agent provide significant cost saving without any substantial reduction in the filterability of the green liquor. These results are quite surprising since, as shown in test 10A, using the treating agent made purely of starch ie without any dextran, provides no improvement in the filterability of the green liquor over an untreated liquor.

It is envisaged that the quantity of starch added to the polysaccharide may be quite high, even as high as 9 times the quantity of polysaccharide since, as shown in tests 8A and 6B which have a dextran/starch ratio of 25/75, there is minimal effect on the filterability of the green liquor as compared with the pure dextran treating agent.

Test Series C

Reference is also made to the results of Test Series C shown in Table 3 and FIG. 1 which display the effect of a dextran/starch ratio in liquor filtration.

These tests were conducted using a Nalco pressure filter. A 13% aqueous solution of dextran (85711) was mixed in various ratios with a 14% by weight solution of starch (PE200).

As a measure of the effectiveness of the treating agent, the resistance to filtration of the filter medium (i.e. wire or cloth support) and the resistance to filtration of the cake (red mud) built up on the filter medium were both measured. Results are shown in Table 3 and FIG. 1. Comparing test runs 2C, 4C and 5C which use the dextan/starch blend, it is apparent that there is little variation in the filter medium resistance or cake resistance as compared with run 1C which uses an aqueous solution solely of dextran as the treating agent. In other words, once again starch may be added to the polysaccharide treating agent to provide a significant cost saving without any substantial reduction in filterability of the green liquor. Test 6C shows that this is quite surprising since the treating agent made solely of the aqueous starch solution does appear to substantially reduce the filterability, at least in regard to cake resistance.

It will be clear to persons skilled in the art that the present invention may be embodied in other specific forms without departing from the spirit or scope of the inventive idea. For example, it is possible that dextran may be replaced by another polysaccharide such as pullalan, alginate, zooglan, lactan or mixtures thereof in the treating agent. It is also envisaged that the present invention is suitable for various types of filtration in the Bayer process eg Kelly pressure filter, sand filter etc.

TABLE 1

Test Series A

| TEST | PRODUCT | PRODUCT RATIO | DOSE (PPM) | TIME FOR 50 MLS | TIME FOR 100 MLS | TIME FOR 150 MLS | RATE 50 | RATE 100 | RATE 150 | % 50 | % 100 | % 150 | Average |
|---|---|---|---|---|---|---|---|---|---|---|---|---|---|
| 1A | Blank | — | 0 | 50 | 141 | 278 | 1.00 | 0.71 | 0.54 | | | | |
| 2A | 85715/PE200 | 100/0 | 5 | 32 | 94 | 185 | 1.56 | 1.06 | 0.81 | 56.3 | 50.0 | 50.3 | 52.2 |
| 3A | Blank | — | 0 | 46 | 120 | 210 | 1.09 | 0.83 | 0.71 | | | | |
| 4A | 85715/PE200 | 75/25 | 5 | 34 | 86 | 155 | 1.47 | 1.16 | 0.97 | 35.3 | 39.5 | 35.5 | 36.8 |
| 5A | Blank | — | 0 | 57 | 140 | 238 | 0.88 | 0.71 | 0.63 | | | | |
| 6A | 85715/PE200 | 50/50 | 5 | 39 | 100 | 175 | 1.28 | 1.00 | 0.86 | 46.2 | 40.0 | 36.0 | 40.7 |
| 7A | Blank | — | 0 | 57 | 137 | 233 | 0.88 | 0.73 | 0.64 | | | | |
| 8A | 85715/PE200 | 25/75 | 5 | 36 | 96 | 171 | 1.39 | 1.04 | 0.88 | 58.3 | 42.7 | 36.3 | 45.8 |
| 9A | Blank | — | 0 | 57 | 131 | 216 | 0.88 | 0.76 | 0.69 | | | | |
| 10A | 85715/PE200 | 0/100 | 5 | 58 | 131 | 215 | 0.86 | 0.76 | 0.70 | -1.7 | 0.0 | 0.5 | -0.4 |

85715 - 7% aqueous solution of dextran
PE200 - 10% (100 gpl) aqueous solution producing by adding powder to 10 gpl NaOH and agitating at 60° C. for 15 mins

TABLE 2

Test Series B

| TEST | PRODUCT | PRODUCT RATIO | DOSE (PPM) | TIME FOR 50 MLS | TIME FOR 100 MLS | TIME FOR 150 MLS | RATE 50 | RATE 100 | RATE 150 | % 50 | % 100 | % 150 | Average |
|---|---|---|---|---|---|---|---|---|---|---|---|---|---|
| 1B | Blank | — | 0 | 75 | 190 | 335 | 067 | 0.53 | 0.45 | | | | |
| 2B | 85715/PE200 | 100/0 | 5 | 52 | 131 | 225 | 0.96 | 0.76 | 0.67 | 44.2 | 45.0 | 48.9 | 46.1 |
| 3B | Blank | — | 0 | 76 | 185 | 316 | 0.66 | 0.54 | 0.47 | | | | |
| 4B | 85715/PE200 | 50/50 | 5 | 45 | 123 | 215 | 1.11 | 0.81 | 0.70 | 68.9 | 50.4 | 47.0 | 55.4 |
| 5B | Blank | — | 0 | 82 | 188 | 320 | 0.61 | 0.53 | 0.47 | | | | |
| 6B | 85715/PE200 | 25/75 | 5 | 52 | 135 | 230 | 0.96 | 0.74 | 0.65 | 57.7 | 39.3 | 39.1 | 45.4 |

PE200 made as 10% (100 gpl) solution by adding powder to 10 gpl NaOH and agitating at 60° C. for 15 mins.
85715 obtained from laboratory retain.
Combination of products make by simply blending together

TABLE 3

Test Series C

| Run # | % PE200 | 85711/PE200** | Medium Resistance, 1/m | | Cake Resistance, m/kg | |
|---|---|---|---|---|---|---|
| | | | Value | Stand. Error | Value | Stand. Error |
| 1C | 0 | 100/0 | 1.93E+11 | 2.0E+08 | 1.88E+11 | 1.0E+09 |
| 2C | 25 | 75/25 | 1.90E+11 | 1.6E+08 | 1.44E+11 | 9.4E+08 |
| 4C | 50 | 50/50 | 9.34E+10 | 2.0E+08 | 9.44E+10 | 8.0E+08 |
| 5C | 75 | 25/75 | 1.97E+11 | 1.3E+08 | 2.27E+11 | 6.1E+08 |
| 6C | 100 | 0/100 | 2.27E+11 | 2.3E+08 | 3.33E+11 | 1.1E+09 |
| 3C | | Blank | 1.86E+11 | 1.9E+08 | 3.67E+11 | 8.8E+08 |

What is claimed is:

1. A treating agent for use in the Bayer process in filtration of caustic sodium aluminuate solution, said treating agent comprising a blend of 200–300 ppm of starch and from 5 ppm to 10 ppm of another polysaccharide.

2. The treating agent of claim 1 wherein another polysaccharide is selected from the group consisting of pullalan, dextran, alginate, zooglan, lactan and mixtures thereof.

3. The treating agent of claim 2 wherein the another polysaccharide is dextran.

4. The treating agent of claim 3 further incorporating a filter aid for assisting the filtration of the caustic sodium aluminate solution.

5. The treating agent of claim 4 wherein the filter aid is calcium aluminate.

6. The treating agent of claim 5 wherein the filter aid is a 12% aqueous suspension of calcium aluminuate.

7. The treating agent of claim 1 comprising 5 ppm of the another polysaccharide.

8. The treating agent of claim 1 comprising 10 ppm of the another polysaccharide.

* * * * *